(12) United States Patent
Fukui

(10) Patent No.: US 7,222,870 B2
(45) Date of Patent: May 29, 2007

(54) BICYCLE SUSPENSION ASSEMBLY

(75) Inventor: Seiji Fukui, Shimonoseki (JP)

(73) Assignee: Shimano Inc., Osaka (JP)

( * ) Notice: Subject to any disclaimer, the term of this patent is extended or adjusted under 35 U.S.C. 154(b) by 42 days.

(21) Appl. No.: 10/995,238

(22) Filed: Nov. 24, 2004

(65) Prior Publication Data

US 2006/0108769 A1    May 25, 2006

(51) Int. Cl.
*B62K 25/00*   (2006.01)
*B62K 19/00*   (2006.01)

(52) U.S. Cl. .................. 280/284; 280/283; 280/275

(58) Field of Classification Search ............ 280/283, 280/284, 275
See application file for complete search history.

(56) References Cited

U.S. PATENT DOCUMENTS

| | | | |
|---|---|---|---|
| 1,753,489 A | 4/1930 | Weinhardt | |
| 2,729,442 A | 1/1956 | Neidhart | |
| 3,473,797 A | 10/1969 | Setzer | |
| 3,942,821 A | 3/1976 | Bock | |
| 4,380,442 A * | 4/1983 | Amsel | 464/93 |
| 4,463,824 A * | 8/1984 | Boyesen | 180/227 |
| 5,121,937 A | 6/1992 | Lawwill | |
| 5,205,572 A | 4/1993 | Buell et al. | |
| 5,217,241 A | 6/1993 | Girvin | |
| 5,226,674 A | 7/1993 | Buell et al. | |
| 5,244,224 A | 9/1993 | Busby | |
| 5,259,637 A | 11/1993 | Busby | |
| 5,284,354 A | 2/1994 | McWethy | |
| 5,306,036 A | 4/1994 | Busby | |
| 5,316,327 A | 5/1994 | Bell | |
| 5,332,246 A | 7/1994 | Buell | |
| 5,354,085 A | 10/1994 | Gally | |
| 5,370,411 A | 12/1994 | Takamiya et al. | |
| 5,385,361 A | 1/1995 | De Bei | |
| 5,409,249 A | 4/1995 | Busby | |
| 5,452,013 A | 9/1995 | Ohmori | |
| 5,460,396 A | 10/1995 | Sutter et al. | |
| 5,474,318 A | 12/1995 | Castellano | |
| 5,570,896 A | 11/1996 | Collins | |
| 5,611,557 A | 3/1997 | Farris et al. | |
| 5,931,052 A * | 8/1999 | Zhao et al. | 74/574.4 |

(Continued)

FOREIGN PATENT DOCUMENTS

DE    4233596 A1    4/1994

(Continued)

*Primary Examiner*—Lesley D. Morris
*Assistant Examiner*—Marlon Arce-Diaz
(74) *Attorney, Agent, or Firm*—Global IP Counselors, LLP

(57) ABSTRACT

A bicycle suspension assembly elastically supports a first frame member to a second frame member. The suspension assembly preferably forms a bottom bracket unit that allows the rear frame member to pivot about the axis of the bicycle crank axle without any adverse affects to the drive train assembly. Preferably, the suspension assembly includes a first suspension member, a second suspension member, a first bearing unit, and a shock-absorbing structure. The first bearing unit is operatively disposed between the first and second suspension members to movably support the first suspension member for rotation relative to the second suspension member about a center pivot axis. In the preferred embodiment, each of the shock-absorbing structure includes a plurality of biasing members. Preferably, the suspension assembly includes a second bearing unit that is axially spaced from the first bearing unit along the center pivot axis.

18 Claims, 12 Drawing Sheets

U.S. PATENT DOCUMENTS

| | | | |
|---|---|---|---|
| 5,997,022 A * | 12/1999 | Matsui | 280/284 |
| 6,149,175 A * | 11/2000 | Fujii | 280/284 |
| 6,149,176 A * | 11/2000 | Fujii | 280/284 |
| 6,209,858 B1 | 4/2001 | Fujii | |
| 6,276,706 B1 * | 8/2001 | Yih | 280/284 |
| 6,481,700 B1 | 11/2002 | Fujii | |
| 6,793,230 B1 * | 9/2004 | Cheng | 280/284 |

FOREIGN PATENT DOCUMENTS

JP 7-4932 U 1/1995

* cited by examiner

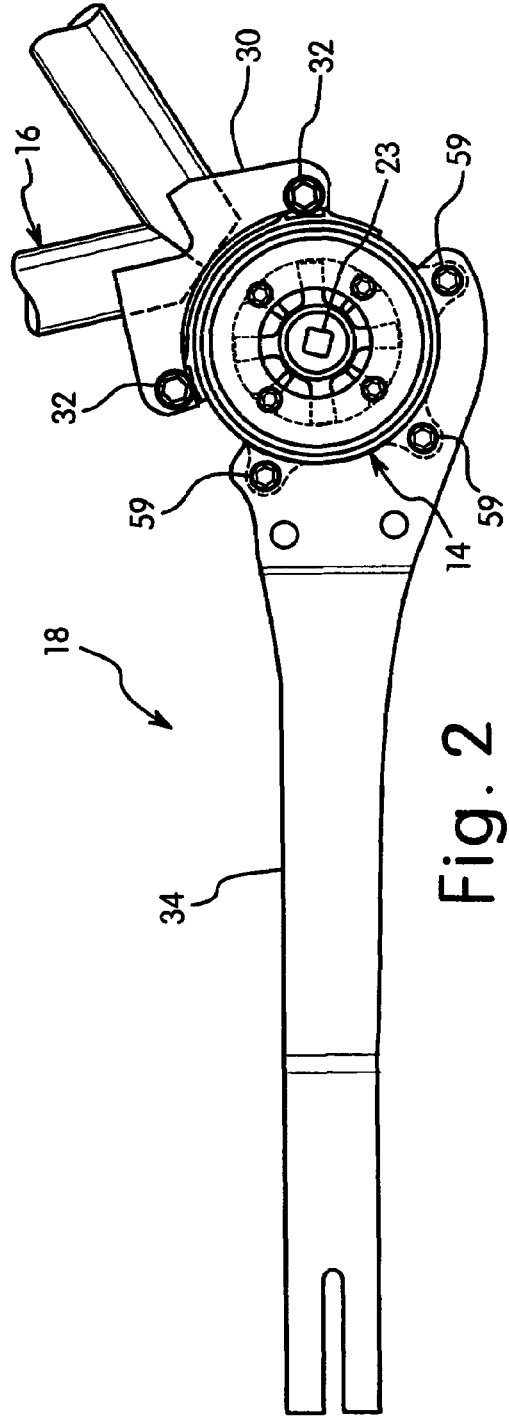
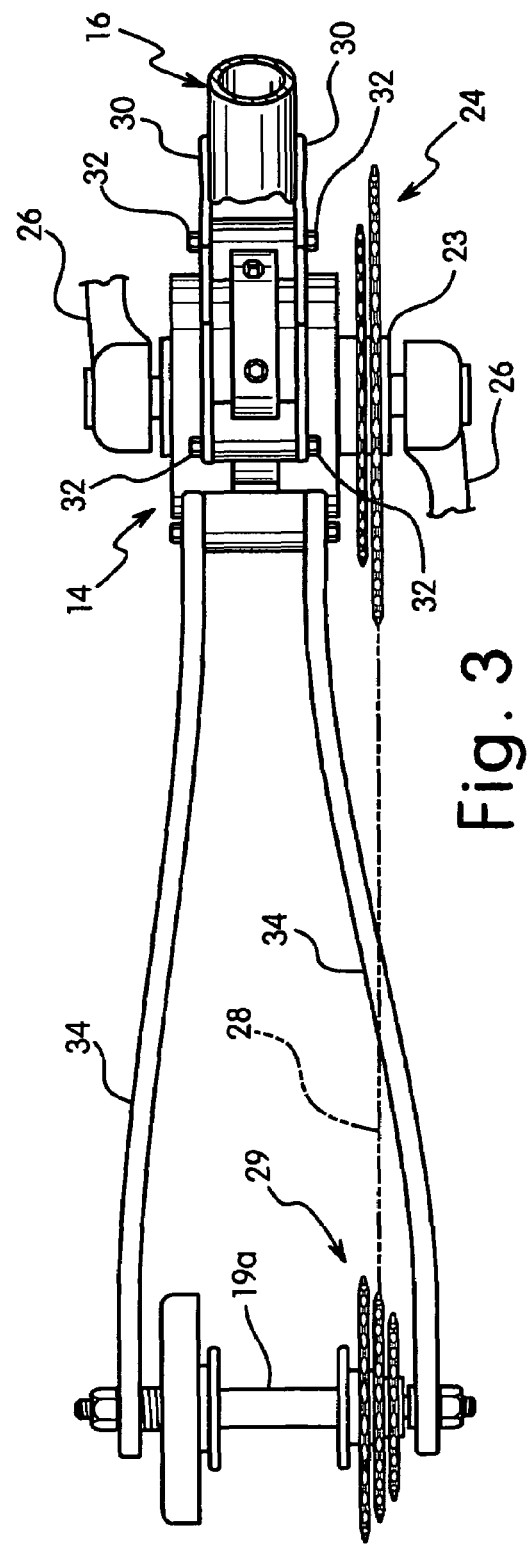
Fig. 2
Fig. 3

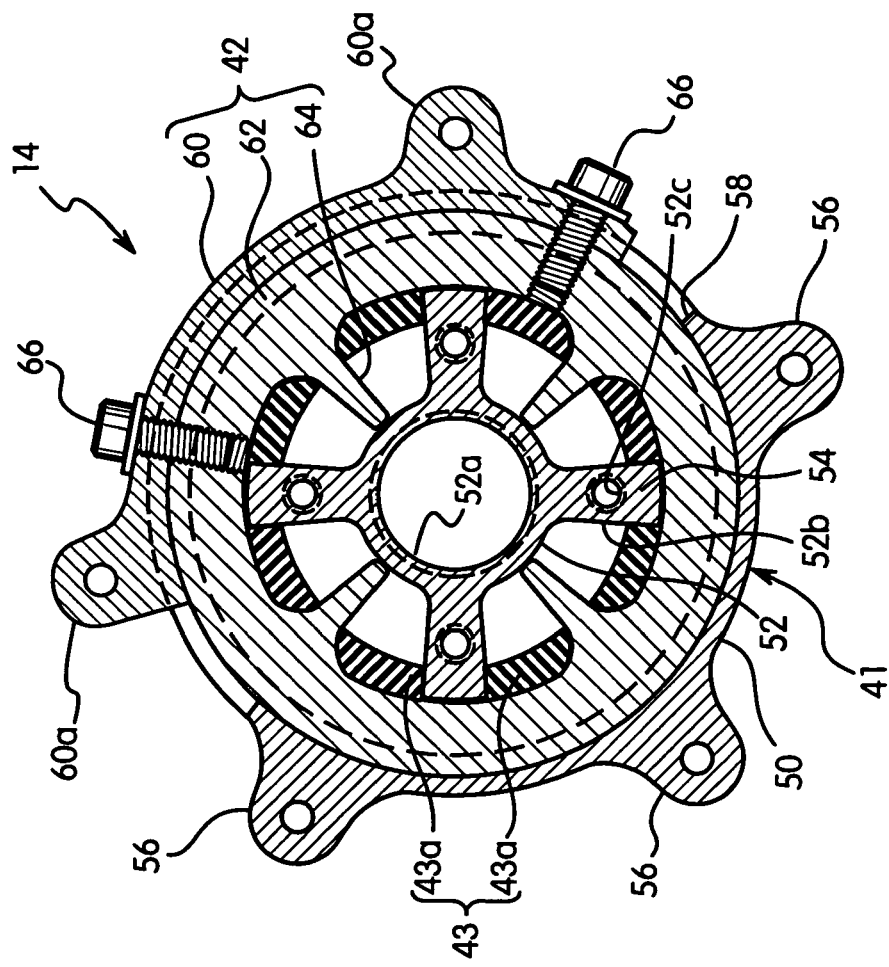
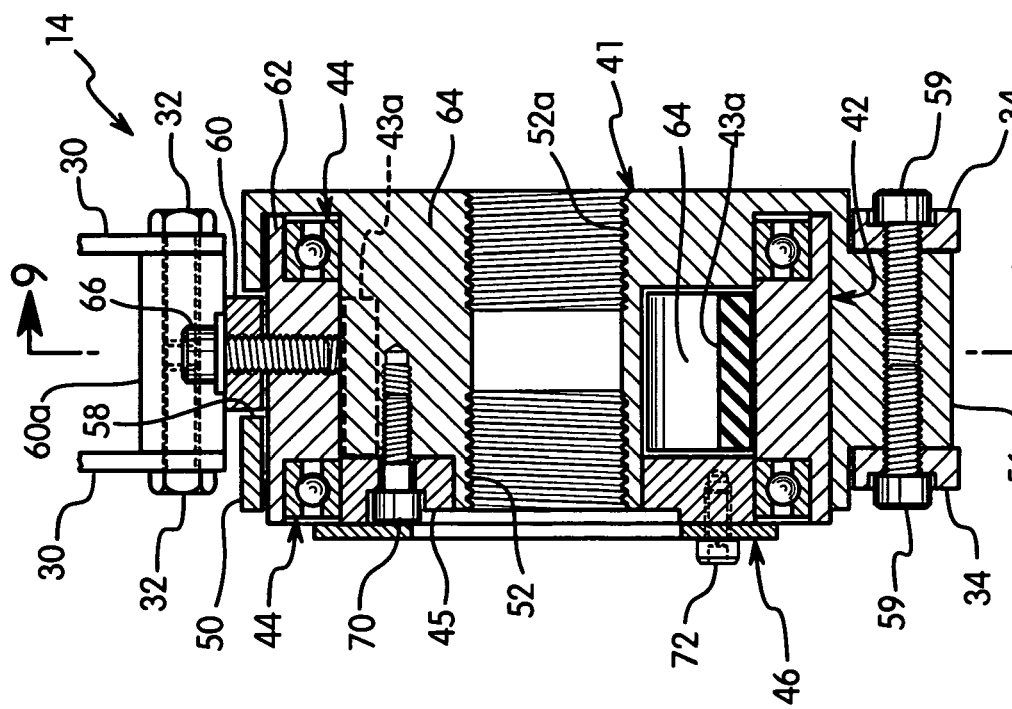

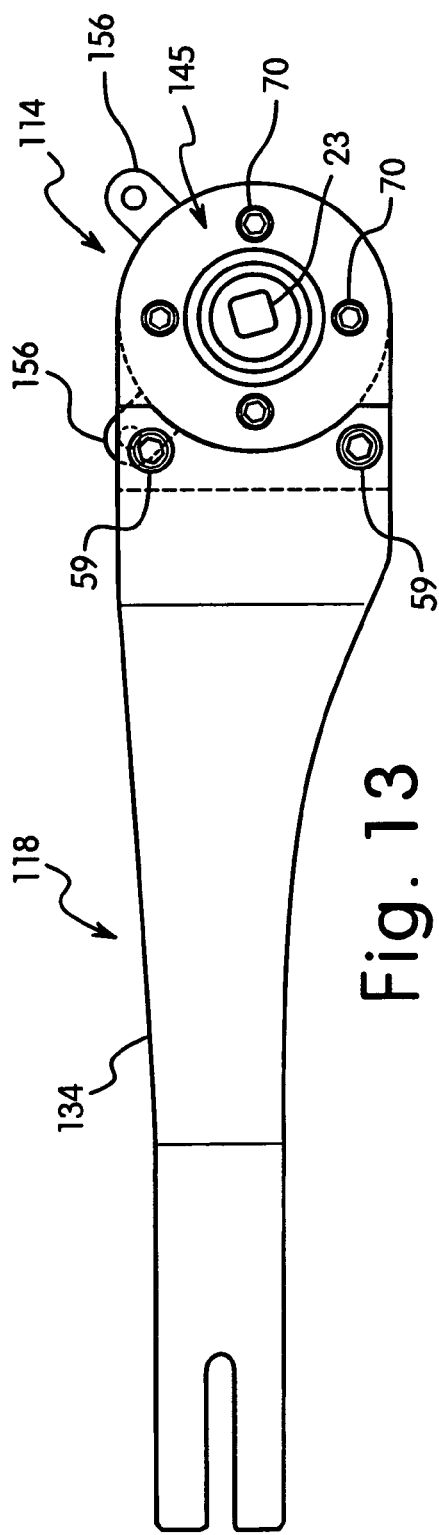
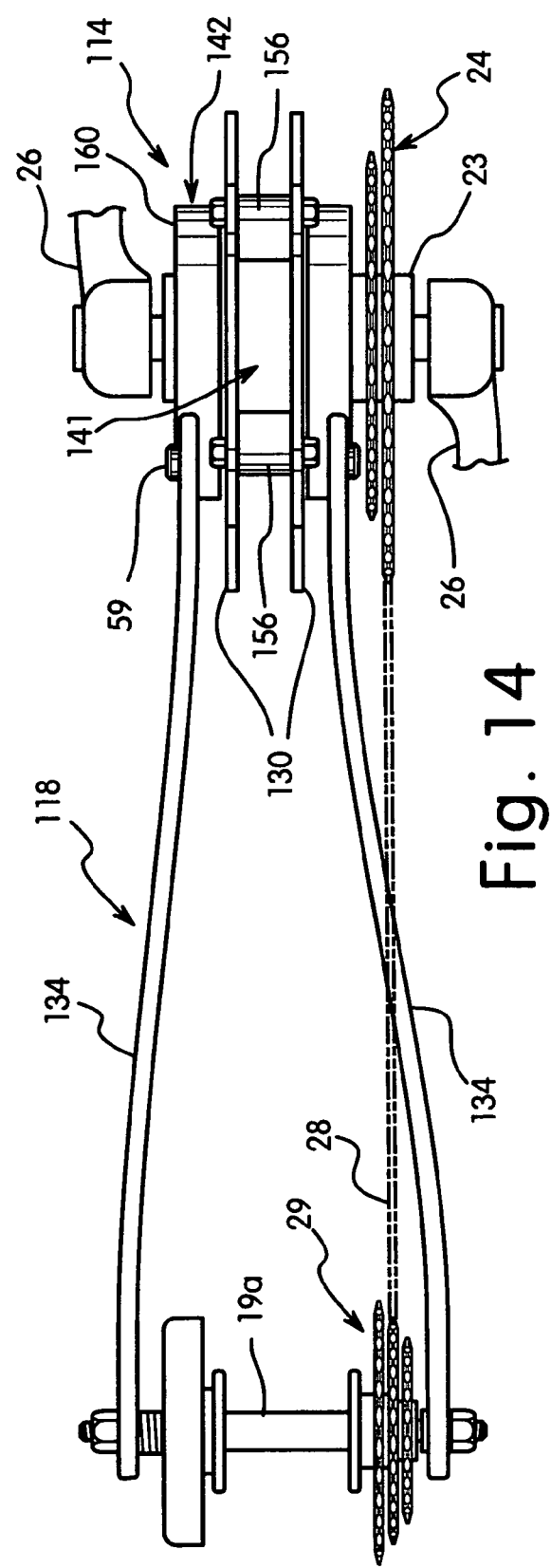

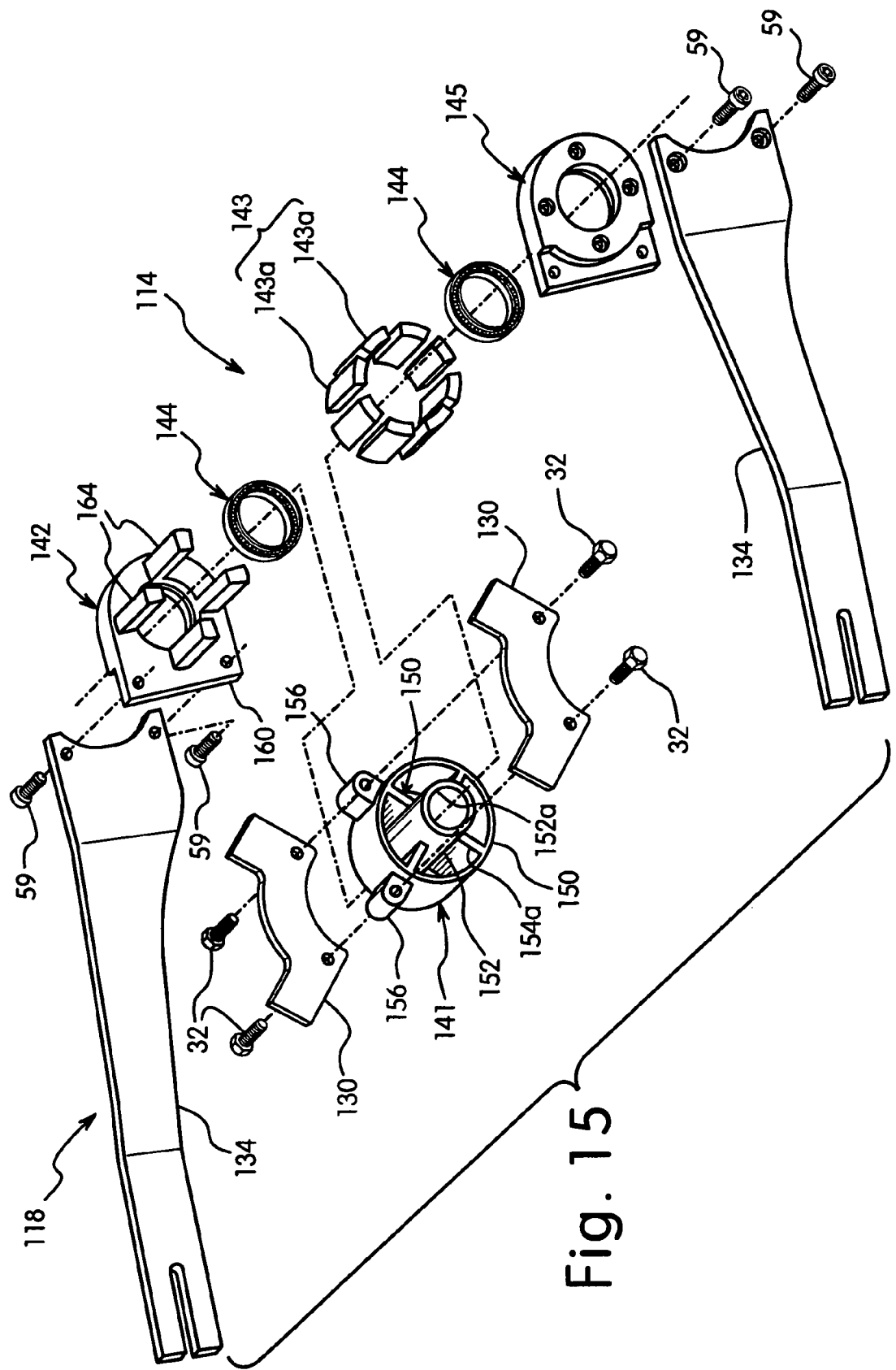

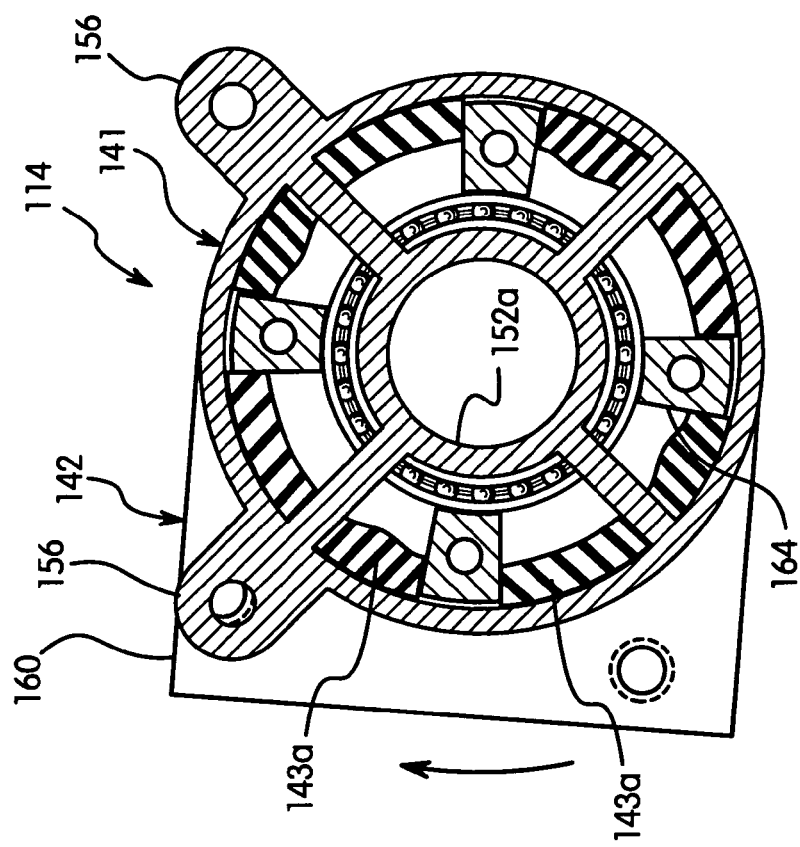
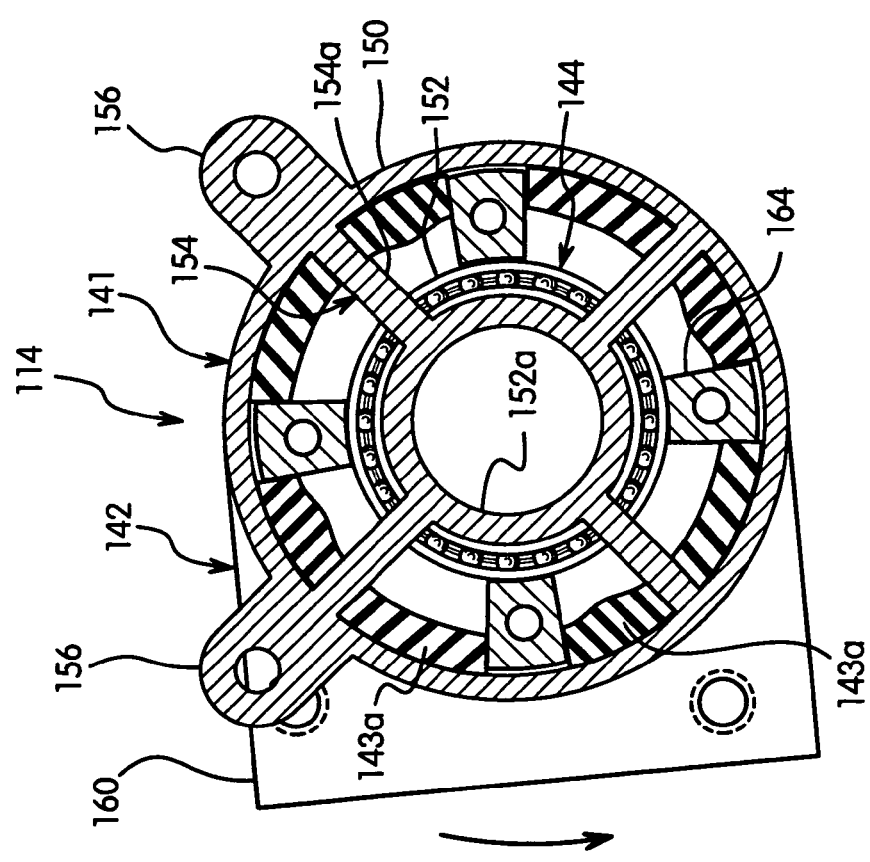
Fig. 20
Fig. 19

BICYCLE SUSPENSION ASSEMBLY

BACKGROUND OF THE INVENTION

1. Field of the Invention

This invention generally relates to a bicycle suspension assembly. More specifically, the present invention relates to a bicycle suspension assembly for elastically coupling a first frame member to a second frame member. The suspension assembly is preferably part of a rear suspension assembly in which a rear frame member is elastically coupled to a main frame member such that the rear frame member pivots about the bottom bracket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames, which typically transmitted the shocks resulting from rough riding surfaces directly to the rider. In other words, most bicycles were not provided with any type of suspension.

Recently, bicycles, especially mountain bikes (MTB) and all terrain bikes (ATB), have been outfitted with front and/or rear suspension assemblies to absorb the shocks transmitted to the rider when riding on a rough road. Moreover, handlebars and seats are now also being provided with suspensions. These suspension assemblies range from very simple to very complex. However, these prior art suspension assemblies have many drawbacks to them. For example, some of the prior suspension assemblies are expensive to manufacture and/or difficult to assemble. Some prior art suspension assemblies require constant adjustments. Other suspension assemblies have adverse affects on the drive train.

Examples of some prior art bicycles utilizing rear suspension assemblies are disclosed in the following U.S. Pat. No. 3,942,821 to Bock; U.S. Pat. No. 5,121,937 to Lawwill; U.S. Pat. No. 5,205,572 to Buell et al.; U.S. Pat. No. 5,217,241 to Girvin; U.S. Pat. No. 5,226,674 to Buell et al.; U.S. Pat. No. 5,244,224 to Busby; U.S. Pat. No. 5,259,637 to Busby; U.S. Pat. No. 5,284,354 to McWethy; U.S. Pat. No. 5,306,036 to Busby; U.S. Pat. No. 5,316,327 to Bell; U.S. Pat. No. 5,332,246 to Buell; U.S. Pat. No. 5,354,085 to Gally; U.S. Pat. No. 5,370,411 to Takamiya et al.; U.S. Pat. No. 5,385,361 to De Bei; U.S. Pat. No. 5,409,249 to Busby; U.S. Pat. No. 5,460,396 to Sutter et al.; U.S. Pat. No. 5,474,318 to Castellano; U.S. Pat. No. 5,452b,013 to Hwang; U.S. Pat. No. 5,570,896 to Collins; U.S. Pat. No. 5,611,557 to Farris et al; U.S. Pat. No. 5,997,022 to Matsui; U.S. Pat. No. 6,149,175 to Fujii; U.S. Pat. No. 6,149,176 to Fujii; U.S. Pat. No. 6,209,858 to Fujii; and U.S. Pat No. 6,481,700 to Fujii.

In view of the above, it will be apparent to those skilled in the art from this disclosure that there exists a need for an improved bicycle suspension assembly. This invention addresses this need in the art as well as other needs, which will become apparent to those skilled in the art from this disclosure.

SUMMARY OF THE INVENTION

One object of the present invention is to provide a bicycle suspension assembly that operates in a smooth manner.

Another object of the present invention is to provide a bicycle suspension assembly that is relatively inexpensive to manufacture.

The foregoing objects can basically be attained by providing a bicycle suspension assembly that is basically provided with a first suspension member, a second suspension member, a first bearing unit, and a shock-absorbing structure. The first suspension member has a first frame connection to be coupled to a first bicycle frame member. The second suspension member has a second frame connection to fixedly couple a second bicycle frame member thereto and a bicycle crank axle receiving bore with a center pivot axis. The first bearing unit is operatively disposed between the first and second suspension members to movably support the first suspension member for rotation relative to the second suspension member about a center pivot axis. The shock-absorbing structure is disposed between the first and second suspension members to expand and contract in response to relative rotation of the first and second suspension members.

In accordance with another aspect of the present invention, the bicycle suspension assembly further comprises a second bearing unit operatively disposed between the first and second suspension members to further support the first suspension member for rotation relative to the second suspension member at a location that is axially spaced from the first bearing unit along the center pivot axis. Preferably, the first and second bearing units are symmetrically arranged about a lateral centerline that extends perpendicular to the center pivot axis and bisects the shock-absorbing structure into two equal lateral parts.

With this arrangement of the first bearing unit and/or the second bearing unit, the first and second bicycle frame members can move more smoothly due to the reduced friction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a partial side elevational view of a portion of the bicycle coupled the rear bicycle suspension assembly illustrated in FIG. 1, with the bottom bracket removed to illustrate the interconnection between the bottom bracket unit and the main and rear frame members;

FIG. 3 is a top plan view of the portion of the bicycle and the rear suspension assembly illustrated in FIG. 2;

FIG. 8 is a longitudinal cross-sectional view of the bottom bracket unit of the rear suspension assembly illustrated in FIGS. 1-5, as seen along section lines 8-8 of FIG. 7, with the bottom bracket removed for purposes of illustration;

FIG. 9 is a transverse cross-sectional view of the bottom bracket unit of the rear suspension assembly illustrated in FIGS. 1-5, as seen along section lines 9-9 of FIG. 8, with the bottom bracket removed for purposes of illustration;

FIG. 13 is a partial side elevational view of the rear bicycle suspension assembly illustrated in FIG. 12, which illustrates the interconnection between the bottom bracket unit and the main and rear frame members;

FIG. 14 is a top plan view of the rear suspension assembly illustrated in FIGS. 12 and 13, with a portion of the bicycle coupled thereto;

FIG. 15 is an exploded perspective view of the suspension assembly illustrated in FIGS. 12-14 in accordance with the second embodiment of the present invention;

FIG. 19 is a transverse cross-sectional view, similar to FIG. 16, of the bottom bracket unit of the rear suspension assembly illustrated in FIGS. 1-5, but with the inner and outer suspension members rotated in a first rotational direction relative to each other; and FIG. 20 is a transverse cross-sectional view, similar to FIGS. 16 and 19, of the bottom bracket unit of the rear suspension assembly illustrated in FIGS. 12-14, but with the inner and outer suspension members rotated in a second rotational direction relative to each other.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
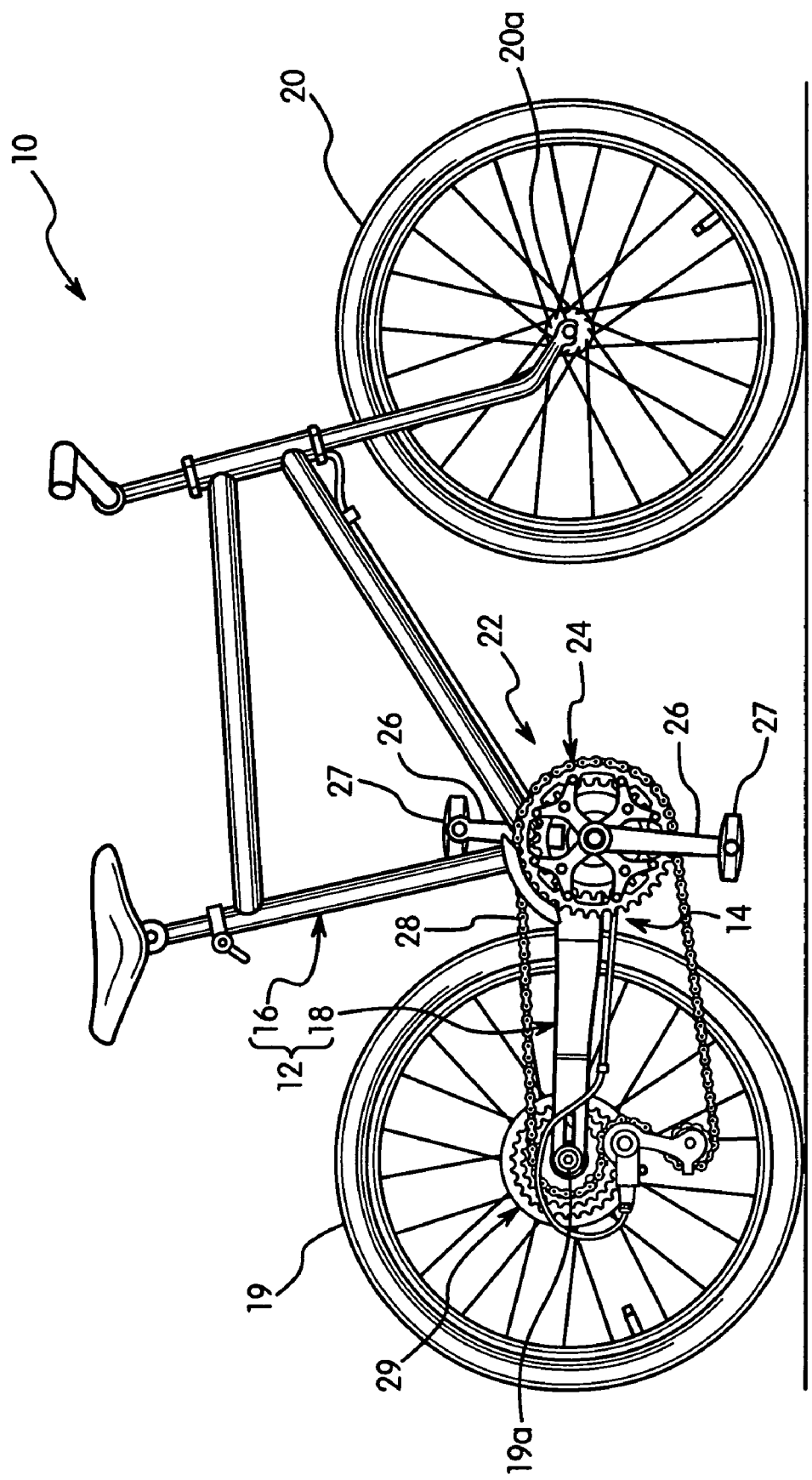
FIG. 1 is a side elevational view of a bicycle, which incorporates a rear bicycle suspension assembly in accordance with a first embodiment of the present invention.
Figure 4:
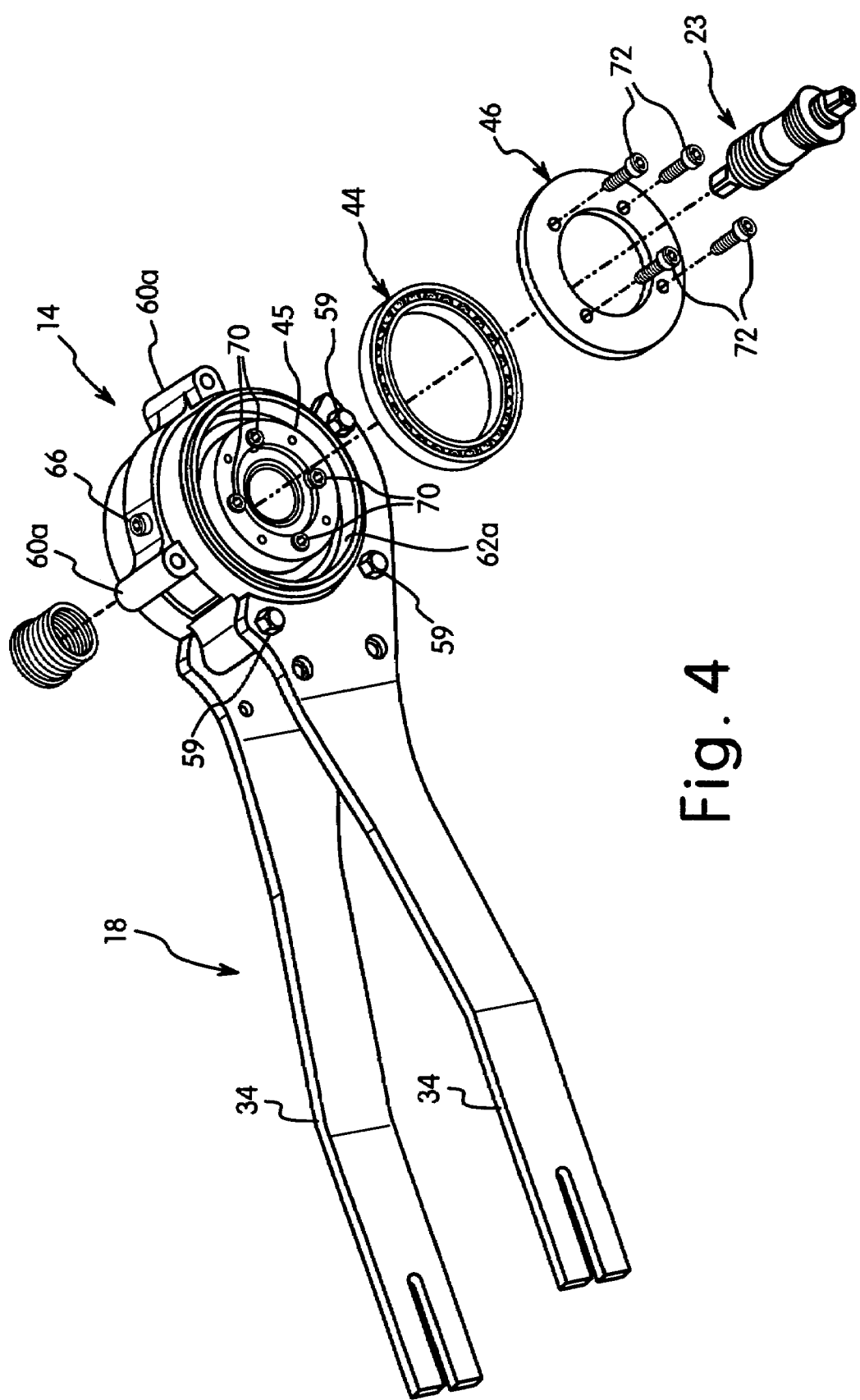
FIG. 4 is a perspective view of the suspension assembly illustrated in FIGS. 1-3 in accordance with the first embodiment of the present invention.

Referring initially to FIG. 1, a bicycle 10 is illustrated having a frame 12 that is equipped with a rear suspension assembly 14 in accordance with a first embodiment of the present invention. The frame 12 basically includes a main frame member 16 and a rear frame member 18 with the suspension assembly 14 elastically coupling the rear frame member 18 to the main frame member 16 to absorb shocks transmitted thereto. Depending on the configuration of the suspension assembly 14, either the main frame member 16 or the rear frame member 18 can be considered either a first frame member or a second frame member.

The bicycle 10 further includes a rear wheel 19 rotatably coupled about a rear hub 19a, a front wheel 20 rotatably coupled about a front hub 20a and a drive train assembly 22 for propelling the bicycle 10. The drive train assembly 22 basically includes a bottom bracket 23, a crank set 24 with a front chain ring set 25, a pair of crank arms 26 with pedals 27, a drive chain 28 and a rear sprocket set 29. Since these parts of the bicycle 10 are well known in the art, these parts will not be discussed or illustrated in detail herein, except as they are modified to be used in conjunction with the present invention. Moreover, various conventional bicycle parts such as brakes, derailleurs, additional sprocket, etc., which are not illustrated and/or discussed herein, can be used in conjunction with the present invention.

Also as used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In the embodiment illustrated herein, the main frame member 16 is constructed of a plurality of rigid, tubular members, which are fixedly coupled together. The main frame member 16 is preferably constructed from a rigid material such as steel, a chrome molly alloy, a carbon composite material, aluminum or other known suitable framing materials.

As seen in FIG. 3, the rear suspension assembly 14 is fixedly coupled to the main frame member 16 by a pair of mounting flanges 30 and four bolts 32. The mounting flanges 30 and four bolts 32 form a first or rear drive train connection. The mounting flanges 30 are preferably welded to one of the tubular members forming the main frame member 16. The mounting flanges 30 extend rearwardly from the main frame member 16 and are spaced apart from each other to form a space for receiving a portion of the suspension assembly 14 therein. The suspension assembly 14 is designed to be received between the mounting flanges 30 and then bolted thereto via the bolts 32.

Figure 5:
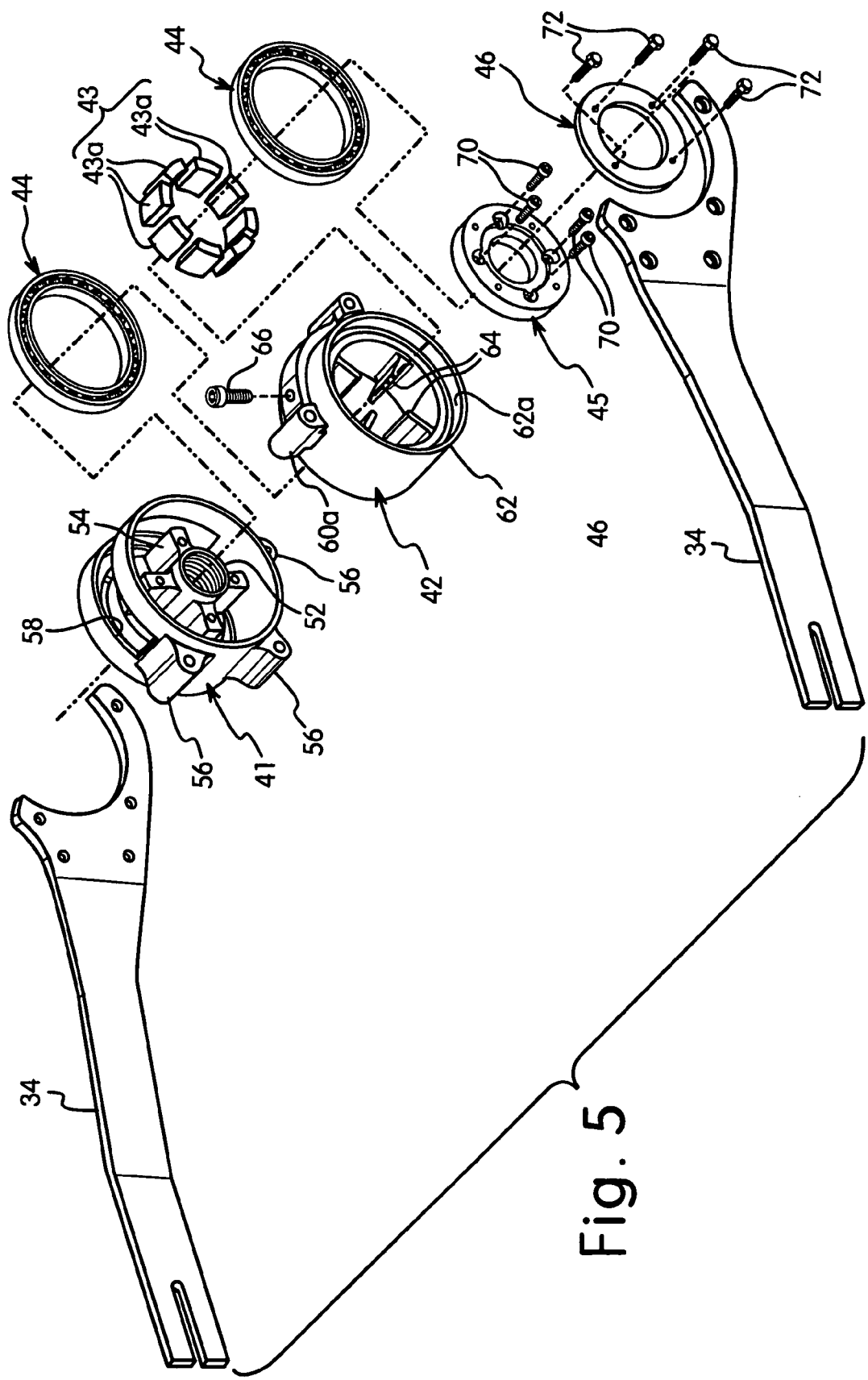
FIG. 5 is an exploded perspective view of the suspension assembly illustrated in FIGS. 1-4 in accordance with the first embodiment of the present invention.
Figure 7:
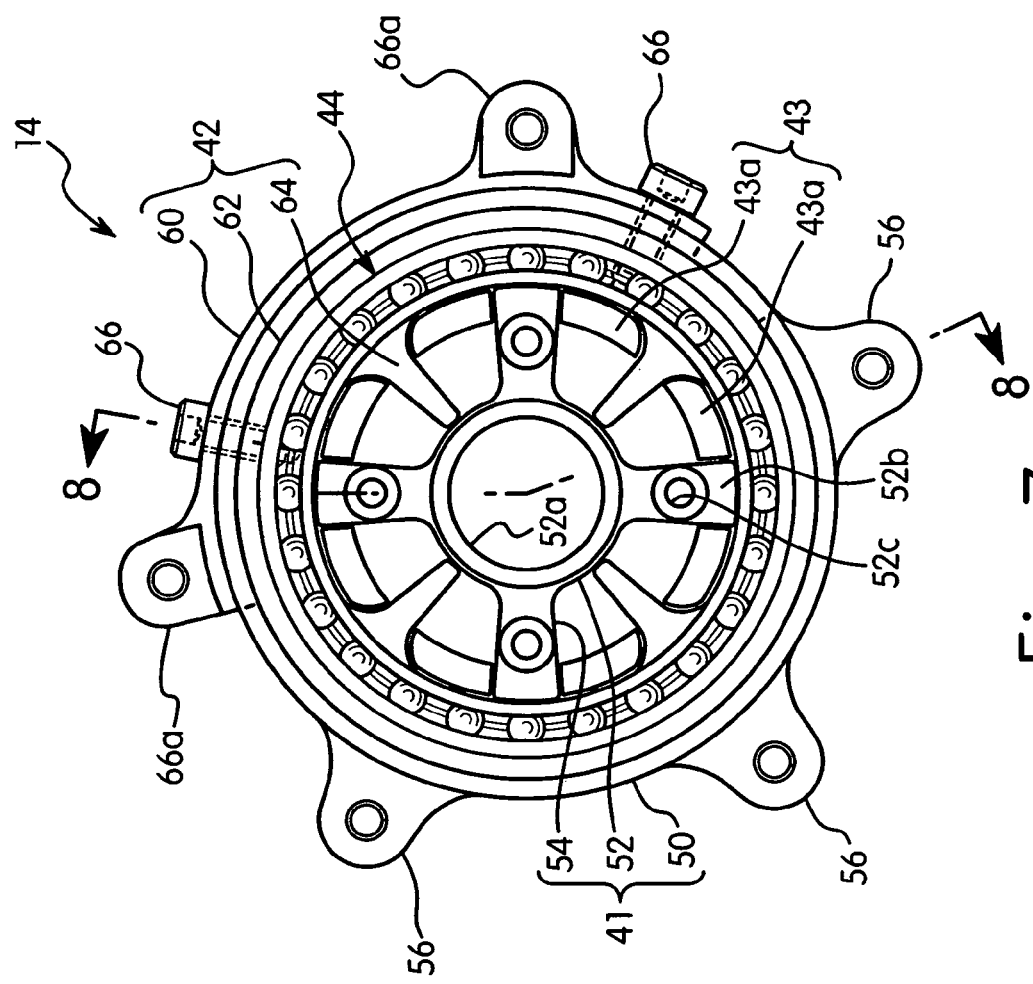
FIG. 7 is a right side elevational view of the bottom bracket unit of the rear suspension assembly illustrated in FIGS. 1-5, with the bottom bracket removed for purposes of illustration.
Figure 6:
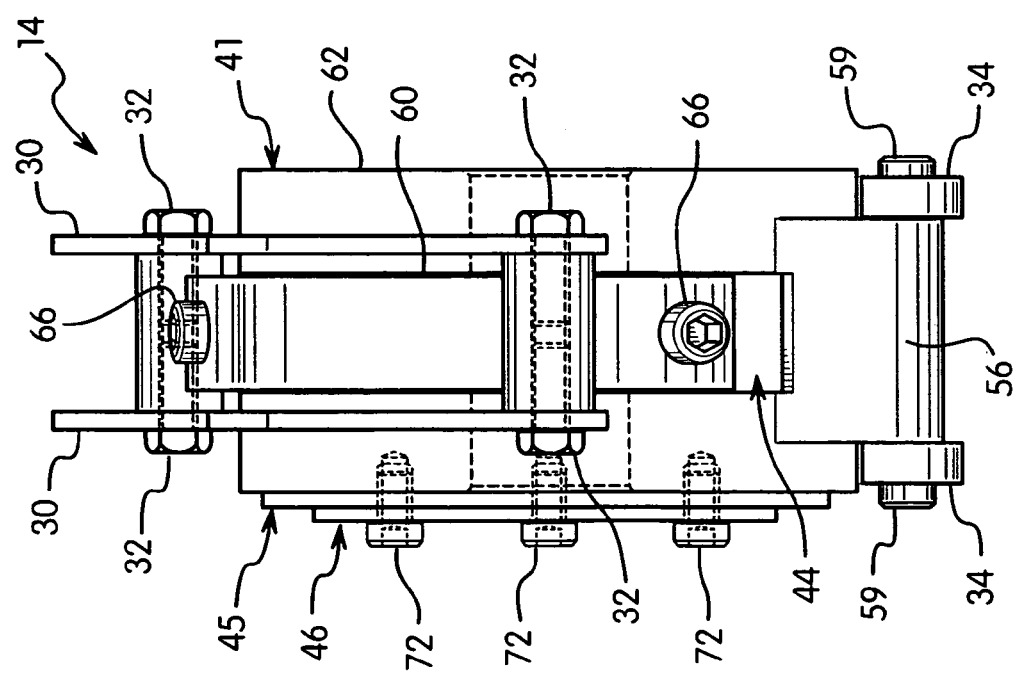
FIG. 6 is a front end elevational view of the bottom bracket unit of the suspension assembly illustrated in FIGS. 1-5, with the bottom bracket removed for purposes of illustration.
Figure 11:
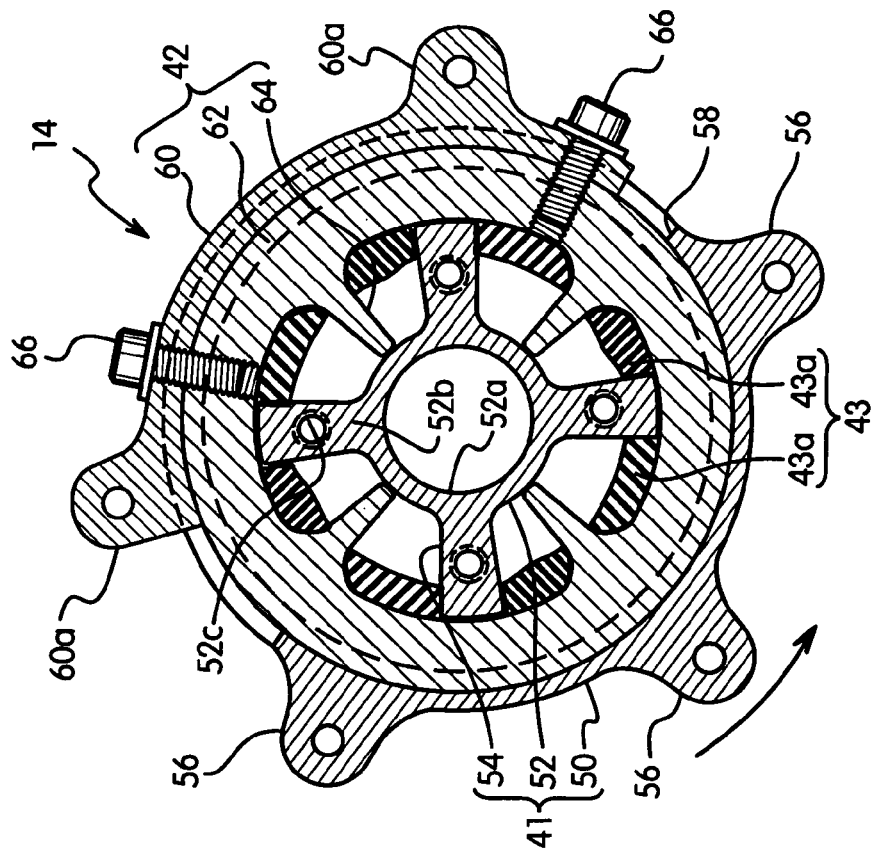
FIG. 11 is a transverse cross-sectional view, similar to FIGS. 9 and 10, of the bottom bracket unit of the rear suspension assembly illustrated in FIGS. 1-5, but with the inner and outer suspension members rotated in a second rotational direction relative to each other.

As best seen in FIG. 5, the rear frame member 18 includes a pair of substantially identical arms 34 (mirror images of each other). Each arm 34 has a front connection end and a rear hub mounting end. The front connection end of each arm 34 is fixedly coupled to part of bicycle the suspension assembly 14, as discussed below. The rear hub mounting end of each arm 34 is fixedly coupled to an end of the axle of the rear hub 19a of the bicycle wheel 19 such that bicycle wheel 19 can rotate about the axle of the rear hub 19a between the arms 34 of the rear frame member 18. The arms 34 are preferably constructed of a rigid material such as aluminum, steel, a chrome molly alloy, a carbon composite material or any other suitable framing type material.

Referring to FIGS. 5-11, the suspension assembly 14 basically includes an outer suspension member 41, an inner suspension member 42, a shock-absorbing structure 43, a pair of bearing units 44, an inner right end cover 45, and an outer right end cover 46. When the bottom bracket 23 is coupled to the suspension assembly 14, this combination of parts form a bottom bracket unit with an integrated suspension. In this embodiment, the outer suspension member 41 is fixedly coupled to the arms 34 of the rear frame member 18, while the inner suspension member 42 is fixedly coupled to the main frame 16. The shock-absorbing structure 43 is operatively disposed between the outer and inner suspension members 41 and 42 to allow limited relative movement between the main frame 16 and the rear frame member 18 with a damping effect. The bearing units 44 are operatively disposed between the outer and inner suspension members 41 and 42 to minimize the friction between the outer and inner suspension members 41 and 42 during relative rotational movement therebetween. Depending on the configuration of the suspension assembly 14, either the outer suspension member 41 or the inner suspension member 42 can be considered either a first suspension member or a second suspension member.

As seen in FIGS. 5-8, the outer suspension member 41 basically includes an outer housing part or portion 50, an inner tubular part or portion 52, and a radial connecting part or portion 54. The radial connecting portion 54 connects the outer housing portion 50 and the inner tubular portion 52. In the preferred embodiment, the outer suspension member 41 is a one-piece, unitary member. However, the outer suspension member 41 can be constructed of several pieces. The outer suspension member 41 is constructed of a rigid material such as aluminum, steel, chrome molly alloy or other suitable materials.

The inner right end cover 45 is fixedly coupled to the inner tubular portion 52 so as to effectively constitute part of the outer suspension member 41. The inner right end cover 45 and the inner tubular part or portion 52 of the outer suspension member 41 movably supports the inner suspension member 42 by the bearing units 44. In particular, the inner right end cover 45 and the inner tubular portion 52 have peripheral surfaces contacting annular inner peripheral surfaces of the bearing units 44. The inner suspension member 42 is disposed in the annular space formed between the outer housing portion 50 and the inner tubular portion 52 with the shock-absorbing structure 43 and the bearing units 44 disposed between the outer and inner suspension members 41 and 42.

The outer housing portion 50 includes a pair of mounting tabs or members 56 and a circumferentially extending slot or opening 58. The mounting members 56 have threaded bolt holes extending therethrough for threadedly receiving mounting bolts 59. The mounting members 56 form a frame mounting connection for coupling the suspension assembly 14 to the arms 34 of the rear frame member 18 via the bolts 59. In particular, the bolts 59 are inserted through holes in the arms 34 and then threaded into the bolt holes of the mounting members 56. Thus, the rear frame member 18 and the outer housing portion 50 are fixed together so as to move as a unit about the center axis of the bottom bracket 23.

The inner tubular portion 52 has a bicycle crank axle receiving bore 52a and a plurality of flanges or abutment members 52b extending radially outwardly from the tubular portion 52. The tubular portion 52 has its main longitudinal axis extending substantially transverse to the main longitudinal axis of the bicycle frame 12 and is coaxially arranged with the center axes of the bottom bracket 23 and the inner suspension member 42. Thus, the bicycle crank axle receiving bore 52a has a center pivot axis that coincides with the center pivot axis of the bottom bracket 23.

The bicycle crank axle receiving bore 52a is preferably sized to receive the bottom bracket 23 therein in a conventional manner. The bicycle crank axle receiving bore 52a has a pair of oppositely threaded portions for fastening the bottom bracket 23 in the bicycle crank axle receiving bore 52a in a conventional manner. Of course, it will be apparent to those skilled in the art that the bicycle crank axle receiving bore 52a can be configured to receive other types of bottom brackets therein.

The flanges or abutment members 52b each have a threaded hole 52c extending in an axial direction from its end face. The flanges or abutment members 52b each form a pair of oppositely facing abutment surfaces for engaging the shock-absorbing structure 43 (the biasing member) as explained below.

As seen FIGS. 5-8, the inner suspension member 42 basically includes a mounting portion 60, a tubular portion 62 and a plurality of flanges or abutment members 64. The inner suspension member 42 is concentrically disposed between the outer and inner parts of the outer suspension member 41 with the mounting portion 60 extending through the slot or opening 58 in the outer housing portion or part 50 of the outer suspension member 41. In the preferred embodiment, the inner suspension member 42 is constructed of two pieces. The two pieces of the inner suspension member 42 are constructed of a rigid material such as aluminum, steel, chrome molly alloy or other suitable materials.

Figure 10:
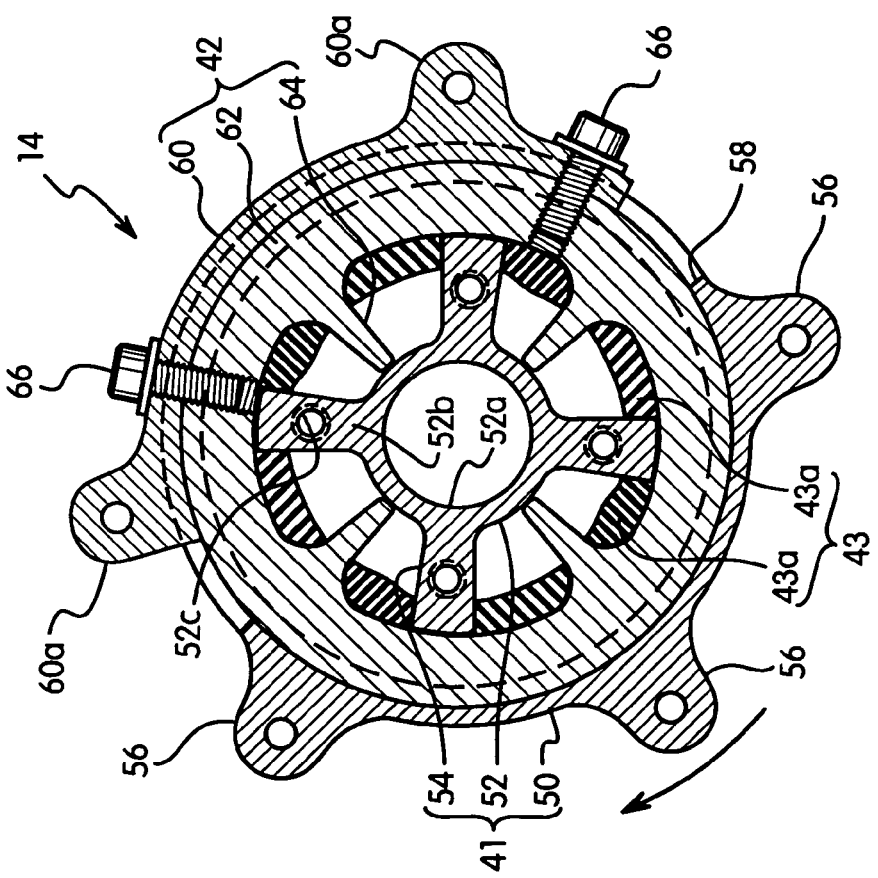
FIG. 10 is a transverse cross-sectional view, similar to FIG. 9, of the bottom bracket unit of the rear suspension assembly illustrated in FIGS. 1-5, but with the inner and outer suspension members rotated in a first rotational direction relative to each other.
Figure 12:
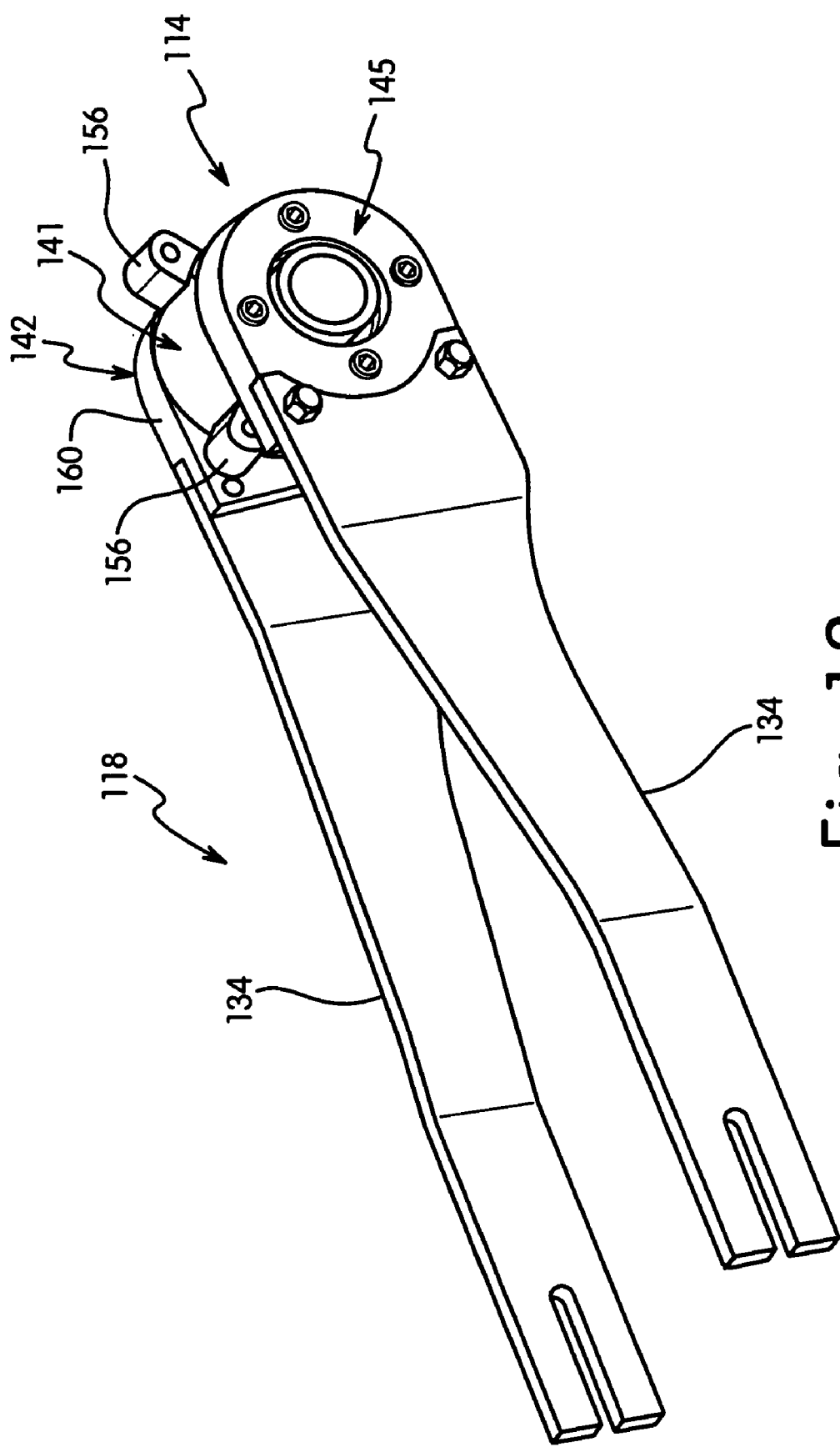
FIG. 12 is a perspective view of a suspension assembly that can be used with the bicycle of FIG. 1 in accordance with a second embodiment of the present invention, with the bottom bracket removed for purposes of illustration.
Figure 18:
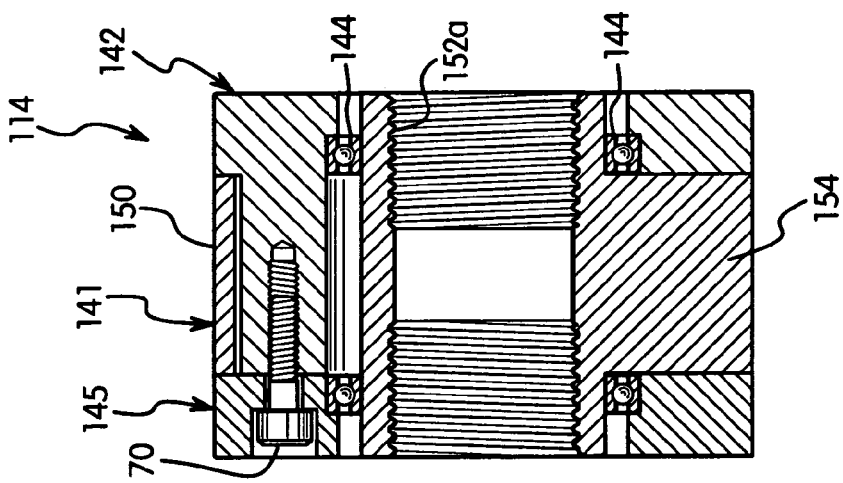
FIG. 18 is a longitudinal cross-sectional view of the bottom bracket unit of the rear suspension assembly illustrated in FIGS. 12-15, as seen along section lines 18-18 of FIG. 16.
Figure 17:
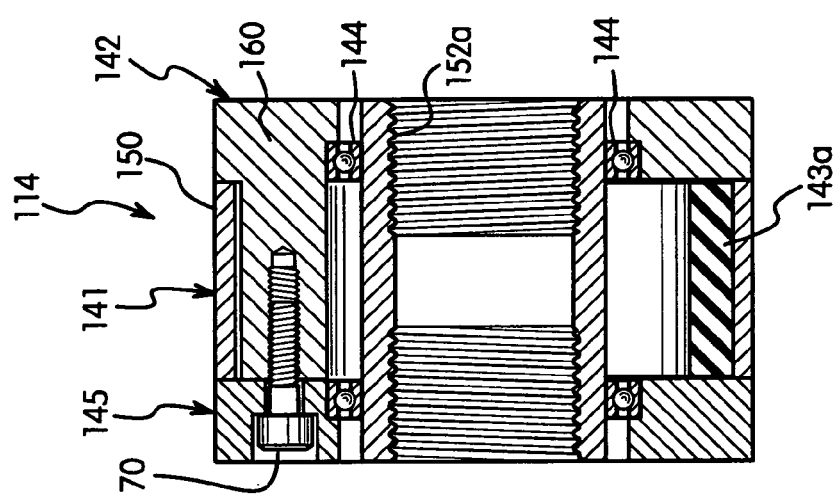
FIG. 17 is a longitudinal cross-sectional view of the bottom bracket unit of the rear suspension assembly illustrated in FIGS. 12-15, as seen along section lines 17-17 of FIG. 16.

The mounting portion 60 of the inner suspension member 42 is fixed to the outer surface of the tubular portion 62 of the inner suspension member 42 by a pair of bolts 66. The mounting portion 60 of the inner suspension member 42 forms a frame connection of the suspension assembly 14. The mounting portion 60 of the inner suspension member 42 extends thorough the circumferentially extending slot 58 of the outer housing portion 50 of the outer suspension member 41. The mounting portion 60 and the slot 58 are dimensioned to allow relative rotational movement between the outer and inner suspension members 41 and 42 as seen in FIGS. 8-10. The mounting portion 60 of the inner suspension member 42 includes a pair of mounting tabs or members 60a. Each of the mounting members 60a has a threaded bolt holes for threadedly receiving the mounting bolts 32. Thus, the inner suspension member 42 is fixed to the mounting flanges 30 on the main frame member 16 by the bolts 32.

The tubular portion 62 of the inner suspension member 42 is disposed in the annular space formed between the portion 50 and 52 of the outer suspension member 41. The tubular portion 62 of the inner suspension member 42 is movably supported on the inner tubular portion 52 of the outer suspension member 41 by the bearing units 44. In particular, the tubular portion 62 of the inner suspension member 42 has a pair of annular inner peripheral surfaces 62a contacting annular outer peripheral surfaces of the bearing units 44. Preferably, the outer surface of the tubular portion 62 of the inner suspension member 42 is spaced from the inner surface of the outer housing portion 50 of the outer suspension member 41 so that there is no direct contact between the outer suspension member 41 and the inner suspension member 42.

The flanges or abutment members 64 extending radially inwardly from the tubular portion 62 of the inner suspension member 42. The flanges or abutment members 64 each form a pair of oppositely facing abutment surfaces for engaging the shock-absorbing structure 43. In particular, the flanges or abutment members 64 are intertwined with the abutment members 52b of the outer suspension member 41 such that the abutment members 52b and 64 alternate about the center axis of the suspension assembly 14. The shock-absorbing structure 43 is interposed between the abutment surfaces of the abutment members 52b and 64 as seen in FIGS. 8-10.

In the present embodiment, the shock-absorbing structure 43 elastically couples the outer suspension member 41 to the inner suspension member 42 as best seen in FIGS. 8-10. Basically, the shock-absorbing structure 43 is positioned between the abutment members 52b and 64 of the outer and inner suspension members 41 and 42 to elastically couple the outer suspension member 41 and the inner suspension member 42 together. The shock-absorbing structure 43 in this embodiment is formed by a plurality of shock-absorbing elements 43a. Preferably, the shock-absorbing elements 43a are preload or slightly compress in the rest condition as seen in FIG. 8. The shock-absorbing elements 43a allow for relative pivotal movement between the outer suspension member 41 and the inner suspension member 42 to absorb shocks transmitted to frame 12 from rear wheel 19.

The shock-absorbing elements or biasing members 43a are preferably elastomeric members, which are sized and shaped to be received between the abutment members 52b and 64 of the outer and inner suspension members 41 and 42. Each of the shock-absorbing elements 43a can be constructed as a solid one-piece member from a single resilient material as seen in FIGS. 8-10. Alternatively, shock-absorbing elements 43a can be constructed as from several resilient and/or compressible materials. Examples of suitable materials for shock-absorbing elements 43a include solid elastomeric such as urethane, or an elastomeric sponge material covered by a gas impermeable elastomeric shell, or a gas impermeable elastomeric shell filled with a compressible fluid.

During normal use, biasing members 43a should have sufficient resiliency to be elastically deformed to absorb shocks transmitted to frame 12 and to spring back to their normal rest positions. As seen in FIG. 9, biasing members 43a are substantially arc shaped members. Of course, biasing members 43a can have a wide variety of shapes depending on the shapes of the other components of the suspension assembly 14. While eight biasing members 43a are used to form the shock-absorbing structure 43 of the illustrated embodiment, it will be apparent to those skilled in the art from this disclosure that the shock-absorbing structure 43 could be constructed of a single elastomeric element, a single spring, a plurality of springs, etc. In other words, it will be apparent to those skilled in the art that the appended claims should not be limited to the shock-absorbing structure 43 illustrated herein.

The first and second bearing units 44 are relative conventional bearing units that are preferably identical. Thus, the first and second bearing units 44 have identical effective rotational diameters. Preferably, the first and second bearing units 44 are also symmetrically arranged about a lateral centerline that extends perpendicular to the center pivot axis and bisects the shock-absorbing structure 43 into two equal lateral parts. In this embodiment, the first and second bearing units 44 are disposed outwardly from the shock-absorbing structure 43 in a radial direction relative to the center pivot axis of the suspension assembly 14. The outer races or rings of the first and second bearing units 44 contact annular inner peripheral surfaces of the mounting portion 60 of the inner suspension member 42.

The inner right end cover 45 is fixedly coupled to the inner tubular portion 52 by bolts 70 so as to effectively constitute part of the outer suspension member 41. The inner right end cover 45 supports the inner peripheral surface of one of the bearing units 44 as seen in FIG. 8. In the preferred embodiment, the inner right end cover 45 is a one-piece, unitary member constructed of a rigid material such as aluminum, steel, chrome molly alloy or other suitable materials.

The outer right end cover 46 is fixedly coupled to the inner right end cover 45 by bolts 72 so as to effectively constitute part of the outer suspension member 41. The outer right end cover 46 supports an axial end surface of one of the bearing units 44 as seen in FIG. 8 to prevent the axial movement of the bearing unit 44. The outer right end cover 46 also effectively secures the outer and inner suspension members 41 and 42. In the preferred embodiment, the outer right end cover is a one-piece, unitary member constructed of a rigid material such as aluminum, steel, chrome molly alloy or other suitable materials.

In operation, when a force or a shock is transmitted to the rear wheel 19, rear frame member 18 together with the outer suspension member 41 will rotate in a clockwise direction about the main axis of bottom bracket 23. In other words, when rear wheel 19 hits a bump, the rear frame member 18 initially causes the outer suspension member 41 to rotate relative to the main frame member 16. This rotation of the outer suspension member 41 causes the shock-absorbing elements 43a to be compressed between the outer and inner suspension members 41 and 42. Once the force or shock on the frame 12 is relieved, shock-absorbing elements 43a will spring back to their rest positions, which in turn will rotate the outer suspension member 41 relative to the inner suspension member 42, due to the resiliency of shock-absorbing elements 43a. In their initial rest positions, shock-absorbing elements 43a are preferably initially compressed or preloaded as mentioned above. Since the absorption of this force or shock is compensated for by rotation about the axis of bottom bracket 23, there will be no affect on the chain 28. In other words, the chain 28 will not loosen or tighten during the rotational movement of the rear frame member 18 with respect to the main frame member 16. During this absorption of the shock or force to the bicycle 10, shock-absorbing elements or biasing members 34a will be elastically deformed or compressed between the outer and inner suspension members 41 and 42.

Second Embodiment

Referring now to FIGS. 12-20, a modified rear suspension assembly 114 and a modified rear frame member 118 will now be explained in accordance with a second embodiment. The suspension assembly 114 and the rear frame member 118 that can be used with the bicycle 10 of FIG. 1 by using a pair of mounting flanges or plates 130 as seen in FIGS. 14 and 15. Also, this suspension assembly 114 uses the bottom bracket 23 of the first embodiment. In view of the similarity between the first and second embodiments, the descriptions of the parts of the second embodiment that are identical or nearly identical to the parts of the first embodiment may be omitted for the sake of brevity.

As best seen in FIGS. 12-15, the rear frame member 118 includes a pair of substantially identical arms 134 (mirror images of each other). Each arm 134 has a front connection end and a rear hub mounting end. The front connection end of each arm 134 is fixedly coupled to part of bicycle the suspension assembly 114, as discussed below. The rear hub mounting end of each arm 134 is fixedly coupled to an end of the axle of the rear hub 19a of the bicycle wheel 19 such that bicycle wheel 19 can rotate about the axle of the rear hub 19a between the arms 134 of the rear frame member 118. The arms 134 are preferably constructed of a rigid material such as aluminum, steel, a chrome molly alloy, a carbon composite material or any other suitable framing type material.

Referring to FIGS. 15-20, the suspension assembly 114 basically includes an outer suspension member 141, an inner suspension member 142, a shock-absorbing structure 143, a pair of bearing units 144, and a right end cover 145. In this second embodiment, the outer suspension member 141 is fixed to the main frame member 16 by the mounting flanges or plates 130, while the inner suspension member 142 and the right end cover 145 are fixed to the arms 134 of the rear frame member 118. When the bottom bracket 23 is coupled to the suspension assembly 114, this combination of parts form a bottom bracket unit with an integrated suspension.

The shock-absorbing structure 143 is operatively disposed between the outer and inner suspension members 141 and 142 to allow limited relative movement between the main frame 16 and the rear frame member 118 with a damping effect. The bearing units 144 are operatively disposed between the outer and inner suspension members 141 and 142 to minimize the friction between the outer and inner suspension members 141 and 142 during relative rotational movement therebetween.

Figure 16:
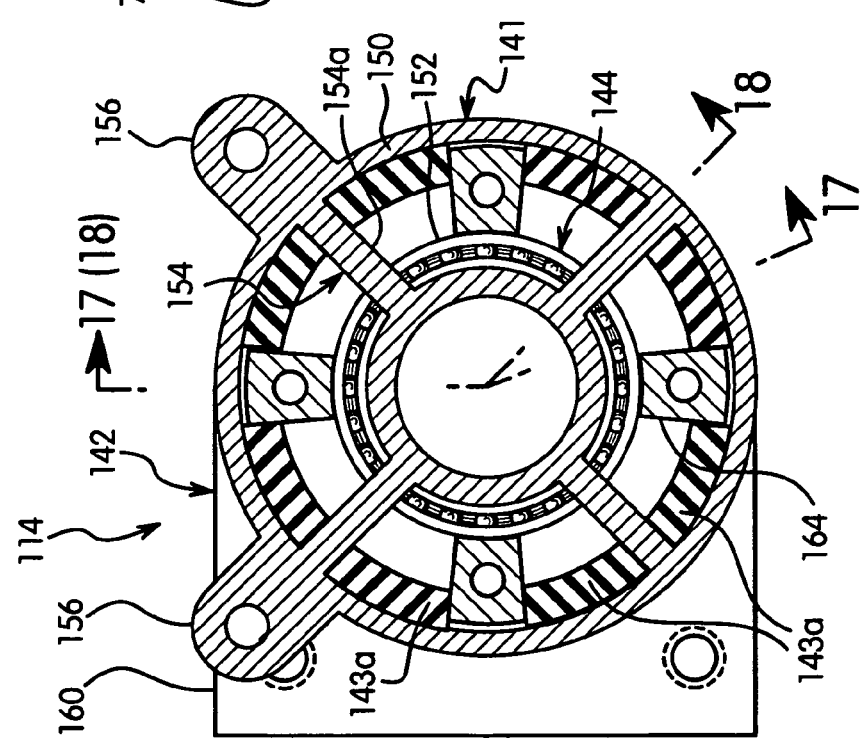
FIG. 16 is a transverse cross-sectional view of the bottom bracket unit of the rear suspension assembly illustrated in FIGS. 12-15, as seen along section lines 16-16 of FIG. 14, with the bottom bracket and other parts removed for purposes of illustration.

As seen in FIGS. 15 and 16, the outer suspension member 141 basically includes an outer housing part or portion 150, an inner tubular part or portion 152, and a radial connecting part or portion 154. The radial connecting portion 154 connects the outer housing portion 150 and the inner tubular portion 152. In this preferred embodiment, the outer suspension member 141 is a one-piece, unitary member. However, the outer suspension member 141 can be constructed of several pieces. The outer suspension member 141 is constructed of a rigid material such as aluminum, steel, chrome molly alloy or other suitable materials.

The outer housing portion 150 includes a pair of mounting tabs or members 156. The mounting members 156 have threaded bolt holes extending therethrough for threadedly receiving mounting bolts 32. The mounting members 156 form a frame mounting connection for coupling the suspension assembly 114 to the main frame member 16 via the bolts 32.

The inner tubular portion 152 has a bicycle crank axle receiving bore 152a. The bicycle crank axle receiving bore 152a is preferably sized to receive the bottom bracket 23 therein in a conventional manner. The bicycle crank axle receiving bore 152a has a pair of oppositely threaded portions for fastening the bottom bracket 23 in the bicycle crank axle receiving bore 152a in a conventional manner.

The radial connecting portion 154 includes a plurality of flanges or abutment members 154a extending radially between the outer housing portion 150 and the inner tubular portion 152. The flanges or abutment members 154a each form a pair of oppositely facing abutment surfaces for engaging the shock-absorbing structure 143 (the biasing member) as explained below.

The inner suspension member 142 basically includes a mounting portion 160 and a plurality of posts or abutment members 164. The pieces of the inner suspension member 142 are constructed of a rigid material such as aluminum, steel, chrome molly alloy or other suitable materials. In this second embodiment, the right end cover 145 is fixedly coupled to the abutment members 164 by bolts 70 so as to effectively constitute part of the inner suspension member 142. In particular, the right end cover 145 acts as a second mounting portion of the inner suspension member 142. Thus, the right end cover 145 and the mounting portion 160 contact the outer rings or races of the first and second bearing units 144 and are coupled to the arms 134 of the rear frame member 118 by the bolts 59.

The posts or abutment members 164 of the inner suspension member 142 are concentrically disposed in the annular space formed between the outer housing portion 150 and the inner tubular portion 152 of the outer suspension member 141. The shock-absorbing structure 143 is disposed between the abutment members 164 and the abutment members 154a. In this second embodiment, the first and second bearing units 144 are further disposed inwardly from the shock-absorbing structure 143 in a radial direction relative to the center pivot axis of the suspension assembly 114.

In the present embodiment, the shock-absorbing structure 143 elastically couples the outer suspension member 141 to the inner suspension member 142 similar to the first embodiment. Basically, the shock-absorbing structure 143 is positioned between the abutment members 154a and 164 of the outer and inner suspension members 141 and 142 to elastically couple the outer suspension member 141 and the inner suspension member 142 together. The shock-absorbing structure 143 in this embodiment is formed by a plurality of shock-absorbing elements 143a. Preferably, the shock-absorbing elements 143a are preload or slightly compress in the rest condition as seen in FIG. 16. The shock-absorbing elements 143a allow for relative pivotal movement between the outer suspension member 141 and the inner suspension member 142 to absorb shocks transmitted to the frame 112 from the rear wheel 119. The shock-absorbing elements or biasing members 143a are preferably elastomeric members, which are sized and shaped to be received between the abutment members 154a and 164 of the outer and inner suspension members 141 and 142. Each of the shock-absorbing elements 143a can be constructed as a solid one-piece member from a single resilient material similar to the first embodiment.

The first and second bearing units 144 are relative conventional bearing units that are preferably identical. Thus, the first and second bearing units 144 have identical effective rotational diameters. Preferably, the first and second bearing units 144 are also symmetrically arranged about a lateral centerline that extends perpendicular to the center pivot axis and bisects the shock-absorbing structure 143 into two equal lateral parts. In this embodiment, the first and second bearing units 144 are disposed inwardly from the shock-absorbing structure 143 in a radial direction relative to the center pivot axis of the suspension assembly 114. The outer races or rings of the first and second bearing units 144 contact annular inner peripheral surfaces of the mounting portion 150 and the right end cover 145. The inner races or rings of the first and second bearing units 144 contact annular outer peripheral surfaces of the inner tubular portion 152.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle suspension assembly comprising:
   a first suspension member having a first frame connection configured to be coupled to a first bicycle frame member;
   a second suspension member having a second frame connection configured to be coupled to a second bicycle frame member and a bicycle crank axle receiving bore with a center pivot axis;
   a first bearing unit operatively disposed between the first and second suspension members to movably support the first suspension member for rotation relative to the second suspension member about a center pivot axis;
   a shock-absorbing structure disposed between the first and second suspension members to expand and contract in response to relative rotation of the first and second suspension members; and
   a second bearing unit operatively disposed between the first and second suspension members to further support the first suspension member for rotation relative to the second suspension member at a location that is axially spaced from the first bearing unit along the center pivot axis,
   each of the first and second suspension members including a first bearing support portion, a second bearing support portion and an intermediate portion interconnecting the first and second bearing support portions together to form an integral unit that remains coupled together during assembly and disassembly of the bicycle suspension assembly,
   the first bearing support portions supporting the first bearing unit and the second bearing support portions supporting the second bearing unit at the location that is axially spaced from the first bearing unit along the center pivot axis.

2. The bicycle suspension assembly according to claim 1, wherein
   the first and second bearing units are symmetrically arranged about a lateral centerline that extends perpendicular to the center pivot axis and bisects the shock-absorbing structure into two equal lateral parts.

3. The bicycle suspension assembly according to claim 1, wherein
   the first and second bearing units are identical.

4. The bicycle suspension assembly according to claim 1, wherein the first and second bearing units have identical effective rotational diameters.

5. The bicycle suspension assembly according to claim 1, wherein
   the first and second bearing units are disposed outwardly from the shock-absorbing structure in a radial direction relative to the center pivot axis.

6. The bicycle suspension assembly according to claim 1, wherein
   the shock-absorbing structure includes a plurality of circumferentially spaced shock-absorbing elements disposed between the first and second suspension members.

7. The bicycle suspension assembly according to claim 1, wherein
   the second suspension member has an outer part with the second frame connection, an inner part with the bicycle crank axle receiving bore and a radial part connecting the outer and inner parts together, with a portion of the first suspension member arranged between the outer and inner parts.

8. A bicycle suspension assembly comprising:
   a first suspension member having a first frame connection configured to be coupled to a first bicycle frame member;
   a second suspension member having a second frame connection configured to be coupled to a second bicycle frame member and a bicycle crank axle receiving bore with a center pivot axis;
   a first bearing unit operatively disposed between the first and second suspension members to movably support the first suspension member for rotation relative to the second suspension member about a center pivot axis; and
   a shock-absorbing structure disposed between the first and second suspension members to expand and contract in response to relative rotation of the first and second suspension members,
   the second suspension member having an outer part with the second frame connection, an inner part with the bicycle crank axle receiving bore and a radial part connecting the outer and inner parts together, with a portion of the first suspension member arranged between the outer and inner parts,
   the inner part of the second suspension member being disposed radially inwardly of the outer part of the second suspension member, the inner part of the second suspension member having a tubular section disposed radially inwardly of the shock absorbing structure with the bicycle crank axle receiving bore being formed in the tubular section,
   the first bearing unit having an inner periphery and an outer periphery with the inner periphery of the first bearing unit contacting an outer surface of the inner part of the second suspension member and the outer periphery of the first bearing unit contacting an inner surface of the first suspension member.

9. The bicycle suspension assembly according to claim 8, wherein
   the first bearing unit is disposed inwardly from the shock-absorbing structure in a radial direction relative to the center pivot axis.

10. A bicycle suspension assembly comprising:
    a first suspension member having a first frame connection configured to be coupled to a first bicycle frame member;

a second suspension member having a second frame connection configured to be coupled to a second bicycle frame member and a bicycle crank axle receiving bore with a center pivot axis;

a first bearing unit operatively disposed between the first and second suspension members to movably support the first suspension member for rotation relative to the second suspension member about a center pivot axis; and a shock-absorbing structure disposed between the first and second suspension members to expand and contract in response to relative rotation of the first and second suspension members, the second suspension member having an outer part with the second frame connection, an inner part with the bicycle crank axle receiving bore and a radial part connecting the outer and inner parts together, with a portion of the first suspension member arranged between the outer and inner parts, the first bearing unit having an inner periphery and an outer periphery with the inner periphery of the first bearing unit contacting the inner part of the second suspension member and the outer periphery of the first bearing unit contacting the first suspension member, the first suspension member being concentrically disposed between the outer and inner parts of the second suspension member with the first frame connection extending through a slot in the outer part of the second suspension member.

11. The bicycle suspension assembly according to claim 1, wherein the second suspension member has an inner part arranged to engage an inner periphery of the first and second bearing units, an outer part with the second frame connection and a radial part connecting the outer and inner parts together.

12. The bicycle suspension assembly according to claim 8, wherein the radial part of the second suspension member includes a plurality of abutment members extending radially between the outer and inner parts of the second suspension member, with the abutment members contacting the shock-absorbing structure.

13. The bicycle suspension assembly according to claim 11, wherein the inner part of the second suspension member includes a tubular portion with a plurality of abutment members extending radially from the tubular portion, with the abutment members contacting the shock-absorbing structure.

14. The bicycle suspension assembly according to claim 11, wherein the first and second bearing units are identical.

15. The bicycle suspension assembly according to claim 11, wherein the first and second bearing units have identical effective rotational diameters.

16. The bicycle suspension assembly according to claim 11, wherein the first and second bearing units are disposed outwardly from the shock-absorbing structure in a radial direction relative to the center pivot axis.

17. The bicycle suspension assembly according to claim 8, wherein the first and second bearing units are disposed inwardly from the shock-absorbing structure in a radial direction relative to the center pivot axis.

18. The bicycle suspension assembly according to claim 11, wherein the shock-absorbing structure includes a plurality of circumferentially spaced shock-absorbing elements disposed between the first and second suspension members.

* * * * *